Aug. 3, 1937.   E. C. BRIGGS   2,088,834
VARIABLE SPEED TRANSMISSION DEVICE
Original Filed Aug. 5, 1931   3 Sheets-Sheet 1

Inventor
Earle C. Briggs
by Geo. N. Goddard
Attorney

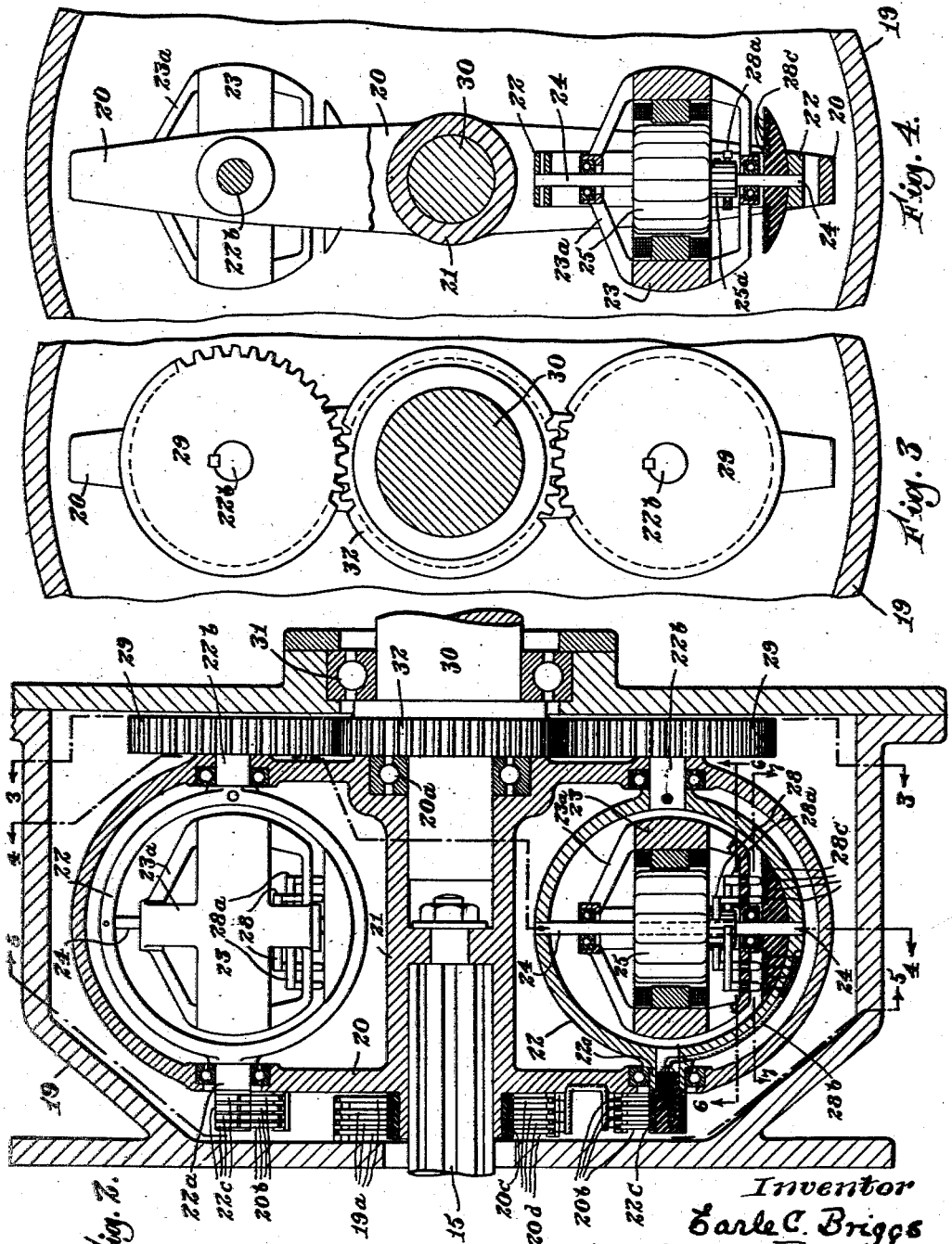

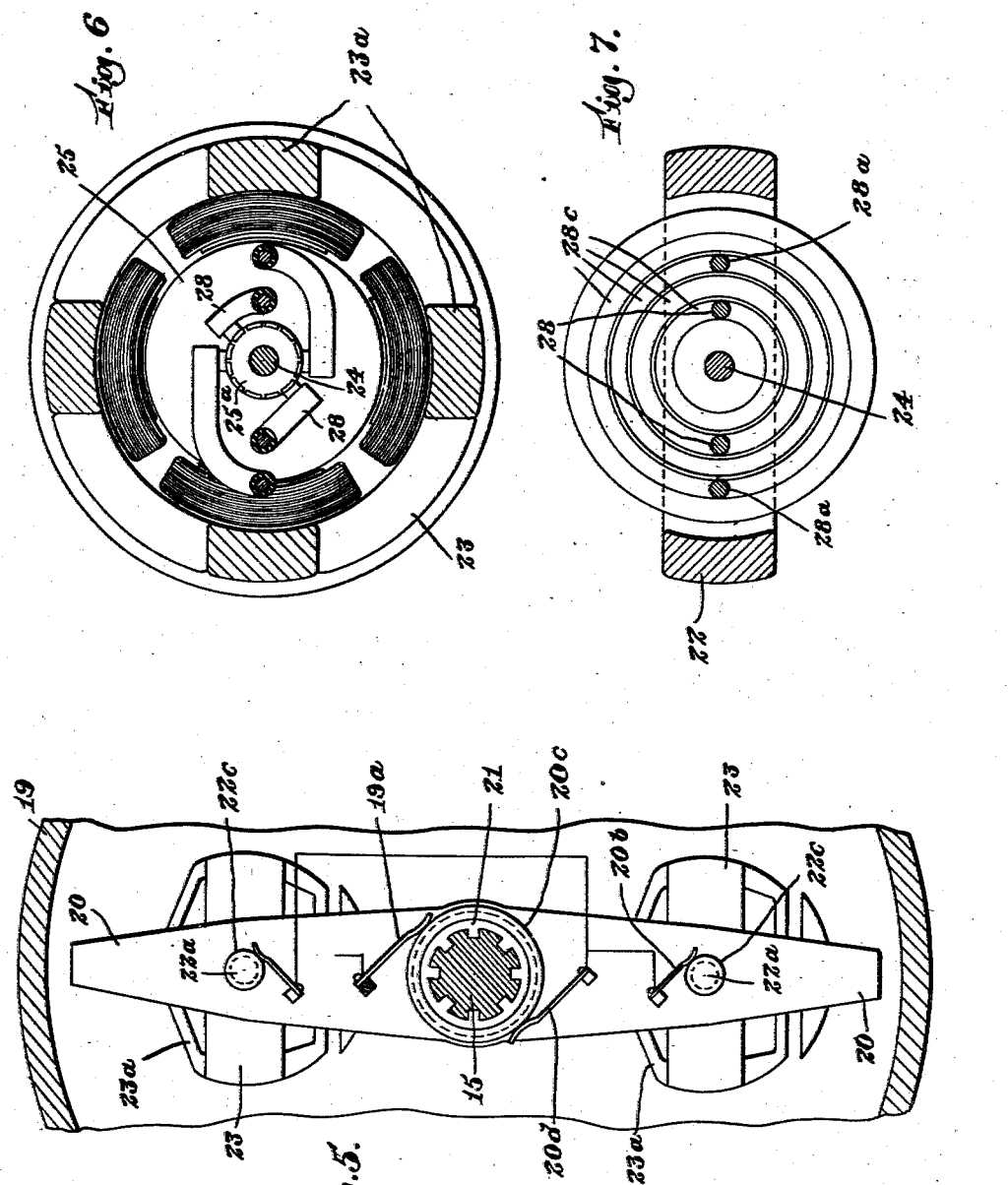

Patented Aug. 3, 1937

2,088,834

UNITED STATES PATENT OFFICE 2,088,834

VARIABLE SPEED TRANSMISSION DEVICE

Earle C. Briggs, Brockton, Mass., assignor of one-tenth to Ardra Louise Briggs, Brockton, Mass.

Application August 5, 1931, Serial No. 555,224
Renewed June 3, 1935

10 Claims. (Cl. 74—5)

This invention relates to variable speed transmission devices and is intended to provide a simple and effective means of transmitting power from a driving shaft to a driven shaft through coupling members that may be constantly engaged with each other, but whose speed ratio is controlled by one or more gyroscopic wheels or rotors so applied that the speed ratio between the drive shaft and the driven shaft shall be automatically controlled according to the speed of revolution of the gyroscopic element and the resistance of the load on the driven shaft.

A transmission built according to the principles of this invention, requires no gear shifting to establish different speed ratios between the two shafts and also may be used without a clutch since the gyroscopically controlled coupling is capable of serving as a clutch, operating with different degrees of strength as the speed of the gyrostat element is accelerated or retarded.

These and other features of the invention will be described in the following specification and will be defined in the claims hereto annexed.

In the accompanying drawings I have illustrated a form of gyroscopically controlled coupling constructed in accordance with the principles of this invention adopting the form of arrangement commonly found in motor cars driven by a gasoline engine, in which gyroscopic elements are substituted for the gear shift transmission heretofore used. In the present form of the invention the gyroscopic control principle is applied to driving the load shaft in a constant direction and for reversing the rotation of the load shaft a reverse gearing of the type well known in motor car construction may be employed, so that an indefinite number of speed variations are given both in a forward and in a reverse direction since the gyroscopic elements produce precisely the same effect as concerns increasing or decreasing speed ratio between the shafts, whether the load shaft or driven shaft is rotated in the same direction or in the reverse direction to the engine shaft.

In the accompanying drawings illustrating the principles of this invention:

Fig. 2 is an enlarged detail view principally in vertical cross section showing the gyroscopic element controlling the speed ratio, comprising two separate rotors mounted symmetrically on opposite sides of the axis of revolution of the carrier by which they are revolved around the common axes of both the driving and the driven shafts.

Fig. 3 is an end elevation of the outside of the revolving driver showing in cross section the driven, or load, shaft and the constant coupling connections with the gyrostatic rotor members.

Fig. 4 is an end elevation of the gyrostatic element, partly on a vertical section inside one of the lateral arms of the driver to expose a cross sectional view of the lower rotor member.

Fig. 5 is a front end elevation of the gyrostatic element showing in cross section the keyed connection of the driving shaft with the revoluble gyroscopic element.

Fig. 6 is a cross section of one of the rotor members of the gyroscopic element on plane 6—6 of Fig. 2 as viewed in an axial direction showing the commutator brushes carried by the rotating field of an electric motor, which constitutes the rotor of each gyroscopic member.

Fig. 7 is a sectional plan view on plane 7—7 of Fig. 2.

Figure 1:
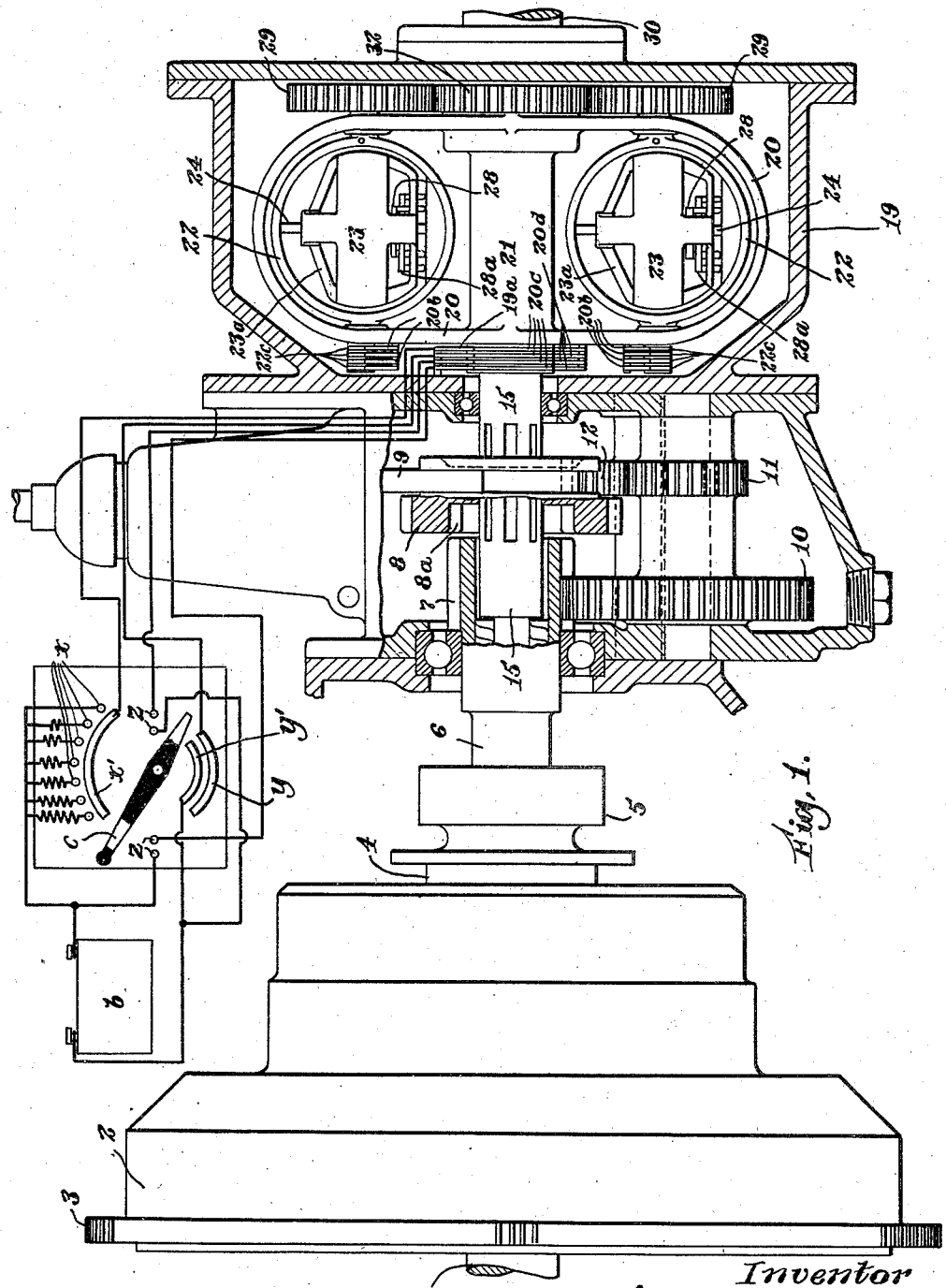
Fig. 1 is a side elevation principally in section showing the reverse and transmission elements for affording rotation to the driven shaft from the engine shaft, the electric circuit control being indicated in the figure in diagrammatic form.

The present type of transmission is based upon, and makes use of, the variable resistance to the change of direction of the axes of a gyrostatic wheel or rotor which is mounted in a revoluble carrier supported in a revolving frame. If one or more gyrostatic wheels, or rotors, are so mounted in such a revolving frame or driver with their individual axes of rotation arranged in a plane parallel to, or included in, a plane that is transverse to the axis of revolution of the frame or driver and be mounted in a support or carrier that is free to revolve about an axis at right angles to the axis of the gyrostatic rotor wheel but parallel with the axis of revolution of the frame, so that the gyrostatic wheel or rotor is capable of maintaining complete parallelism of its axis throughout its entire path of revolution, along with its carrier, the gyroscopic element may be coupled constantly with a driven shaft, preferably arranged in coaxial alignment with the axis of revolution of the gyroscopic driver. This constant coupling between each gyroscopic element comprising a rotor and its revoluble carrier member and the load shaft that is to be driven thereby, may be utilized to cause rotation of the driven shaft against resistance or load at different rates of speed according to the strength of the opposition that the rotor opposes to any change in the direction of its own axis. The greater the speed and the mass of the rotor, the greater will be the torque exerted upon the driven shaft, while at the same time with this arrangement, increase in load while the device is running, by affording a greater resistance to the tendency of the rotor to maintain parallelism of axis, tends to partially overcome the resistance of the rotor to any change in direction of axis, thereby lessening the speed of rotation of the load shaft to compensate for heavier loads.

According to the form illustrated in these drawings, the shaft 1 may be regarded as the engine shaft or power shaft of a motor car power plant to which is secured the fly wheel 2 carrying the gear ring 3, through which the starting motor turns over the engine shaft in starting the gasoline engine. The movable clutch member 4, which is used to clutch the engine shaft 1 to its rearward extension or continuation 6, is slidably mounted on shaft 6 in the usual manner and has attached a grooved fork receiving spool by which the clutch is thrown out through the agency of the clutch pedal in the usual manner.

As this transmission unit is shown as applied to a motor car provision is made for reversing the driving shaft 15, which revolves the rotor carrier. Accordingly, the rear end of shaft 6 is provided with a pinion 7, while the driving shaft of the transmission, shaft 15, telescopes at its forward end into the rear end of said pinion member 7 and upon what, will herein be termed the driving shaft is, longitudinally splined a slidable gear 8 having internal teeth 8ª that may be intermeshed with the teeth of the pinion 7 and having also peripheral teeth adapted to intermesh with a reverse gearing train 11 and 12, of which gear 11 is compounded with gear 10 that intermeshes constantly with the pinion 7. As the sliding reverse gear is moved forward into direct mesh with pinion 7, shaft 15 rotates in unison with pinion 7 and pinion 8 is then out of mesh with reversing pinion 12. When by means of the reverse lever 9 the shift gear 8 is moved rearwardly along its splines, it unmeshes from its direct connection with pinion 7 and intermeshes with the reverse gearing train 12, thus driving shaft 15 in the opposite direction. This is in accordance with well known practice and does not of itself form the subject of this invention.

The rearward end of the driving shaft 15 passes into the hollow axle 21 of a revoluble frame or driver 20 to which it is bolted and keyed, as shown in Fig. 2. This revolving driver 20, being directly secured to the shaft 15, rotates in unison with it whether in a forward or in a reverse direction, according to the position of the shift gear 8. This revolving frame or driver 20, as shown, is designed to carry two gyroscopic elements in balanced relation to each other, but obviously additional gyroscopic members can be provided in like relation to the axle of the driver since the form of the carrier may be changed to accommodate and support such additional gyroscopic elements.

At a suitable distance from the center of the axle 21 there is mounted a gyroscopic ring or supporting gimbal having at either end trunnions to permit the ring to turn about an axis, preferably parallel to the axis of revolution of the driver 20. Inside this ring is mounted a supporting spindle 24, which extends at right angles to the axis of rotation of the ring 22 and on this spindle 24 is mounted the rotary gyrostat wheel or rotor 23, which therefore revolves about an axis in a plane at right angles to the axis of rotation of the ring 22 and to the axis of rotation of the driver 20.

In order to drive and control the speed of rotation of each gyrostat rotor member or wheel, I prefer to construct each gyrostat member or rotor as an electric motor of the type having a rotating field and a fixed armature, since it is desirable in order to get the maximum resistance of the rotor to changes in the direction of its axis, to distribute the weight of the motor as far from its axis of rotation as possible. Accordingly, the armature is fixed to the supporting spindle 24 and the field 23 is provided on opposite sides of the middle with supporting spiders 23ª carrying at their hubs anti-friction bearings supported on the spindle 24. As indicated in Fig. 2, Fig. 4 and Fig. 6, the brushes 28 are carried by the field and revolve around the commutator 25ª, the brushes themselves being supplied with current from a cable 28ᵇ leading to contact rings 28ᶜ mounted on the supporting ring 22 and concentrically surrounding the spindle 24. The intake end of this cable has its conductor wires lead to contact rings 22ᶜ on the trunnions 22ª of the supporting ring 22. The current is supplied to these contact rings by brushes or contact fingers 20ᵇ carried by the revolving driver 20 and these contact fingers or brushes 20ᵇ are supplied with current from collector rings 20ᶜ surrounding the forward end of the axle 21 of the driver which receive the current from stationary fingers or brushes 19ª mounted on the stationary frame 19 and surrounds and supports the revoluble driver 20. Current may be conducted to the coils of the revolving field member 23 comprising the rotor by contact rings similar to 28ᶜ engaged by contact shoes carried by the revolving rotor.

It will therefore be seen that the current flows into conductors carried by the revolving driver 20 through the agency of brushes and contact rings, then through additional brushes and contact rings is carried to conductors on supporting ring 22, whence the current is conducted to a final set of collector rings 28ᶜ from which they enter the commutator brushes 28.

On the trunnion 22ᵇ of each gyrostat ring or carrier is secured a pinion 29 mounted outside the carrier 20. These pinions 29 are in constant mesh with a pinion 32, which is secured to the driven or load shaft 30, whose forward end is reduced in diameter to telescope inside the hollow axle 21 of the driver, an anti-friction bearing element 20ª being interposed between this reduced end of the load shaft 30 and the surrounding portion of the axle, as indicated at 20ª. An additional anti-friction bearing element 31 is shown interposed between the portion of the driven or load shaft 30 and the surrounding part of the fixed casing or housing 19.

The circuits of the motors which form the gyrostat elements are controlled as shown diagrammatically in Fig. 1 by a switch arm c, which is movable over an arcuate contact member x' to establish connection between the different terminals x of a resistance box to give different strengths of current. The middle of the switch c is insulated from its opposite ends one of which bridges over the gap to establish contact between two terminals y and y' to establish a return circuit to the negative terminal of the battery b.

Now, when the motors constituting the rotor elements of the gyroscopic element are not being energized to control the transmission, it may be desirable to lock or electrically hold the rotor elements of the motors from rotating. Particularly would this be the case when it is desired to stop the car and apply the brake, just as one would throw out the clutch in stopping the car according to present practice. In order, therefore, to exert force to hold the electric rotors against rotation, I have provided an additional pair of armature brushes 28ª which, as most clearly shown in Fig. 6, are circumferentially offset in relation to the armature 25 in such a manner that when the current flows through the brushes 28ª it exerts its force to hold the electric rotor against rotation.

If we consider now the action of this gyroscopic element in coupling together for driving purposes the driving shaft 15 and the load shaft 30, we will see first that the driver frame 20, being directly secured to the driving shaft 15, must rotate in unison with that shaft. If no current is passing through the gyrostat motors, the revolution of the driver 20 around its axis operates to rotate on its own axis the motor-carrying rings 22 without opposition, by reason of the travel of the pinions 29 around the then stationary pinion 32 of the load shaft, disregarding frictional resistance. Second, when the electric rotors are energized by the current they then act as gyrostats to resist the rotation of the rings 22 on their respective axes and oppose, or prevent, the rotation of the pinion 29 about its own axis; but as the driver 20 revolves and the pinion is gyrostatically held against rotation on its own axis, the pinions 29 drag or push the pinion 32 around and, instead of being rotated through their engagement with the load shaft pinion 32, cause the latter to rotate on its axis. However, as the action of the rotor is to maintain the axis 24 of each electric rotor in parallelism with itself throughout the revolution of the rotor around the axle, the effect will be to produce an apparent rotation of each pinion 29 in a direction reverse to the revolution of the driver so that if the gyrostatic action is strong enough to prevent any change of direction of the axis 24, the epicyclic movement of the pinions 29 will cause a rotation of the load shaft pinion in the same direction as the rotation of the drive shaft 15 but at twice the speed of the drive shaft, if the three pinions are of equal size or have the same number of teeth. This ratio of course will be affected by the ratio between the teeth of the gyroscopically controlled pinions and the teeth of the pinion secured to the load shaft.

If the load be heavy enough to overbalance the resistance to rotation of the gyroscopic elements to rotation, then the gyrostat element will yield somewhat to this superior resistance and will rotate slowly in a direction reverse to the direction of the revolution of its driver and to the rotation of the load shaft. To the extent that the gyroscopic element rotates in this manner, the speed of rotation transmitted to the load shaft is reduced. Consequently, the gyroscopic element acts in a manner somewhat analogous to a slipping clutch, so that the load is started more gradually, thereby permitting a more gradual starting or acceleration than if the gyroscopic element did not yield in this manner. More power for transmitting may be applied by increasing the speed of rotation of the rotor about its axis, this being effected by impressing a stronger current on the motor circuit.

On the other hand, in slowing down or stopping, the current through the rotor is reduced through the control switch and, if it be desired to operatively or dynamically cut off the gyrostat from action, the circuit may be established through the offset or rotation-resisting brushes 28ª by throwing the switch arm c (Fig. 1) to establish the circuit through terminals z, which lead to the brushes 28ª. Of course any desired mode of applying a brake to the gyrostat rotors might be employed, but the offset brushes, as above described, afford a convenient means for quickly bringing the rotors to rest so that they no longer exert any driving action whatever on the load shaft and therefore permit application of the brake to the motor vehicle without opposition. The object of the offset brushes supplied through a separate circuit then is to quickly arrest the rotation of the gyrostat rotors so that, in a dynamic sense, the driving shaft and the load shaft are completely uncoupled. It will be understood of course that so long as the rotors have any appreciable speed of rotation, they do act as a variable coupling for coupling together the driving shaft and the load or driven shaft and that the coupling torque depends upon the speed of rotation of the gyrostat rotors, since after they are once constructed their mass remains constant. As before stated, the action permits varying degrees of coupling strength and always permits a slip between the coupling members somewhat analogous to the slip of a friction clutch but without the objectionable features and wear involved in such slipping of the clutch. The gyroscopic coupling yields to increases in load resistance as when climbing a hill and picks up again when the load resistance decreases, so that there is always maintained an automatic balance, so to speak, between the load and the coupling transmission, thus giving complete flexibility beside giving a wide variation in permissible speeds. It also gives the same number of speeds backward in reverse as it does in direct forward driving.

It will be understood that while I have shown the friction clutch interposed between the engine shaft and the reverse gearing, the invention is not confined to that arrangement. Indeed, in transmissions where no reverse is needed the clutch might well be entirely omitted, since the gyroscopic transmission performs the function of a clutch and may be regarded as being completely unclutched when its rotor elements are at rest since in that case the revolving carrier 20 will revolve without any gyrostatic resistance being exerted upon the pinions 29, which will roll freely around the load pinion 32 without exerting any driving torque on the load shaft.

There is no coupling action when the gyrostat rotors are at rest, while maximum coupling is obtained when maximum speed of the motors is secured through impressing upon them the maximum strength of current. An increase in load may partially overcome the resistance to revolution about its own axis of each rotor ring or supporting member, thus causing revolution of each supporting member at greater or less speed according to the amount of overbalance between the load and the gyrostatic resistance. Since the gyrostat rotors are electrically driven at different speeds according to the current impressed, the driving and the driven shafts may be regarded as electrodynamically coupled through the middle of a gyroscopic element of variable strength and according to the ratios existing at different times between the load or drag and the strength of such dynamic coupling, different speed ratios will be realized between the two shafts.

By the term "variable speed transmission" used in this specification and claims is meant a transmission mechanism which transmits the rotation of a driver member to a driven member at different speed ratios governed by the transmission itself and not a mere retarding device that acts as a brake or retarder to slow down the rotation of the driving element as well as of the driven element. Furthermore, by the term "gyroscopic element" is meant a rotor or fly-wheel mounted in a supporting frame or carrier that is itself pivotally supported about an axis perpendicular to the axis of rotation of the carrier, so that the unidirectional tendency of the rotor axis serves to oppose a yielding resistance to the revolution of the carrier on the carrier axis. This resistance varies according to the speed of rotation of the rotor.

What I claim is:

1. The combination with a driver and a driven shaft, of an epicyclic gearing couple in constant mesh, the planetary member of which is carried by the driver eccentrically thereof and revolves about the axis of said driver, the other gear of said couple being secured to the driven shaft, a gyroscopic element comprising rotor and carrier members, each rotating about an axis perpendicular to that of the other and both mounted eccentrically of the driver to have a revolving motion about the axis of the driver, one member of said gearing couple being secured to the carrier coaxially therewith, the other member being secured to the driven shaft.

2. A continuously revolving driver, a rotor, a carrier-frame supported in said driver on a shaft having revolution about the axis of said driver and rotatable about its own axis located eccentrically of the axis of said driver and in parallelism therewith, said rotor mounted in said carrier-frame and rotatable about an axis transverse to the axis of said driver, and a driven shaft having driven connection with said carrier shaft by means of epicyclic gearing.

3. The combination of a continuously revolving driver, a driven shaft, a gyroscopic element carried by said driver eccentrically thereof to be revolved with the driver about the driver axis, said gyroscopic element embracing rotor and carrier members, the rotor being rotatable about an axis lying in the plane of its revolution about the axis of said driver, the rotor carrier being rotatable about an axis parallel with and outside of the axis of said drive shaft, a pinion secured to the carrier coaxially thereof and normally held against rotation about its own axis by the gyrostatic action of said rotor, said pinion being operatively connected with a pinion secured to the driven shaft about which the first pinion revolves.

4. A differential speed transmission embracing two independently rotatable parallel shafts interconnected through the medium of constantly meshing pinions, one shaft having planetary movement about the axis of the other, and a gyroscopic element comprising rotor and carrier members, each rotatable about an axis perpendicular to that of the other, the carrier being secured to said planetary shaft and exerting through the gyrostatic action of said rotor resistance to the rotation of one of said pinions, and a revolving driver forming a support for the gyroscopic element and its shaft.

5. A differential speed transmission embracing in its construction, two independently rotatable shafts, a revolving frame secured to the driving shaft, a pinion secured to the driven shaft, a plurality of revolving rotary pinions mounted on axles parallel with, but outside of, the axis of revolution of said frame, gyrostatic elements comprising revoluble holders secured to the pinion axles, and a gyrostat wheel mounted in each of said holders to rotate about an axis perpendicular to the axis of rotation of the respective holders.

6. A gyroscopic transmission mechanism embracing in combination with a driving shaft and a driven shaft, an intermediate driving connection including an electrically driven gyroscopic motor affording a variable speed transmission dependent on the strength of the electric current applied to said gyroscopic motor, and means for varying the point of application of the electric current to the gyroscopic motor to counteract and arrest its rotation.

7. A variable speed transmission embracing in combination a revoluble driver, a driven shaft, an epicyclic transmission train comprising a central member and a planetary member, one of which is secured to the driven shaft and the other rotatably mounted on said driver to permit rotation about an axis parallel to the driver axis, and a gyroscopic element whose rotor spins about an axis lying in a plane perpendicular to both the aforesaid axes and whose supporting carrier is coaxially secured to said planetary member thereby producing gyrostatic resistance to the rotation of the planetary member on its own axis and controlling the rotation of the central member.

8. A variable speed transmission embracing a driver continuously revoluble about a stationary axis, a load shaft, a gyroscopic element comprising a rotor whose axis of rotation lies in the plane of revolution of said driver, a rotor carrier rotatable about an axis parallel with the axis of revolution of said carrier, a planetary drive transmitting member secured to said rotor carrier coaxially thereof and having uninterrupted driving connection with the load shaft for transmitting variable speed to said load shaft according to the load resistance and the gyrostatic resistance afforded by said gyroscopic element.

9. A change speed transmission embracing in combination a driver continuously revoluble about a fixed axis at a predetermined speed, a variable speed rotor-carrier mounted for rotation about an axis outside of and parallel with the axis of the driver, a gyro rotor mounted in said carrier for rotation about an axis perpendicular to the axis of the driver and of the carrier, a variable speed driven shaft coaxial with the driver axis, and a transmission train forming a continuous driving connection between the carrier and the driven shaft including a variable speed gear secured to the variable speed carrier concentric with the carrier axis, and a gear secured to the driven shaft.

10. A variable speed transmission embracing a driver continuously revoluble about a fixed axis at a predetermined speed, a variable speed rotor-carrier revolubly supported by said driver, a gyro-rotor rotatively mounted in said carrier for rotation about an axis disposed in a plane perpendicular to the axis of the carrier and of the driver and located in the plane of the axis of rotation of the carrier, a transmission gear secured to said carrier concentrically about the axis of the carrier, and transmission means continuously interconnecting said gear with the driven shaft.

EARLE C. BRIGGS.